May 16, 1967  M. LEVINE  3,319,660
METERING PLUG
Filed June 1, 1964
FIG. 1
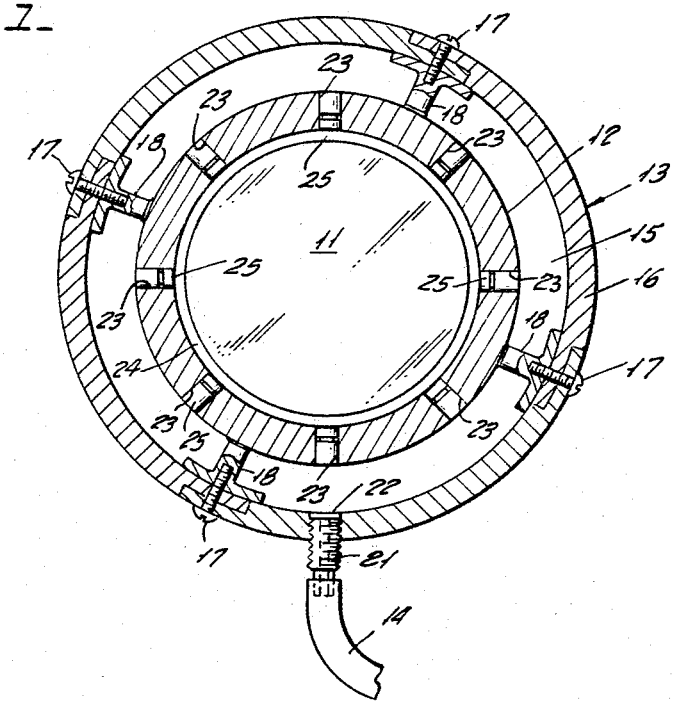
FIG. 3
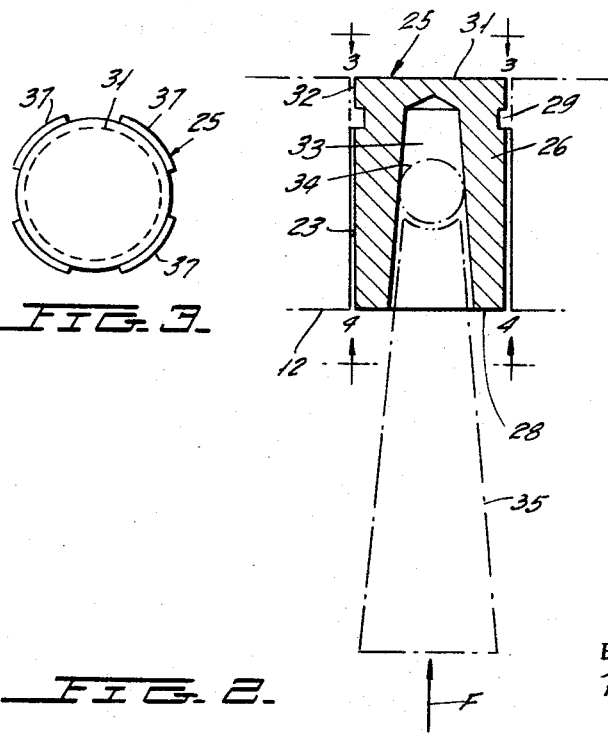
FIG. 2
FIG. 4
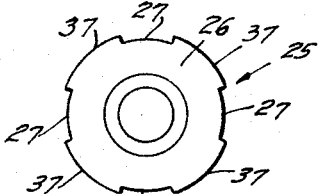
INVENTOR.
MELVIN LEVINE
BY Raymond R. Skolnick

United States Patent Office 3,319,660
Patented May 16, 1967

3,319,660
METERING PLUG
Melvin Levine, New York, N.Y., assignor to Sperry Rand Corporation, Ford Instrument Company Division, Long Island City, N.Y., a corporation of Delaware
Filed June 1, 1964, Ser. No. 371,714
8 Claims. (Cl. 138—42)

This invention relates to air bearing means and more particularly to the construction and assembly of the metering plug.

Mechanical bearings have been found unsatisfactory for many space age applications where only the lowest of friction losses can be tolerated. Because of this, air bearings, even though relatively expensive to manufacture with precision, are being used in an increasing number of applications. A typical application is the support of an inertia mass in an accelerometer.

Early precision air bearing units utilized holes pierced in aluminum foil as metering orifices. More recently, metering plugs with drilled or etched metering orifices have been employed. The pierced foil construction when in good working order produced satisfactory results but elaborate fixtures were required for production. The small pierced holes very readily became plugged with dirct leading to high turbine torque of the bearing.

Prior art metering plugs did not include any means for readily adjusting air flow or fit with respect to the support member bore in which the plug was mounted. Air flow was adjusted by filing or stoning the plug orifices and fit was adjusted by knurling the exterior surface of the plug. Both processes often produced rough dirt catching surfaces. In addition filing the orifices caused unequal air flows through different orifices and consequently produced high turbine torques.

The instant invention overcomes the aforesaid difficulties of prior art air bearings by providing a cylindrical metering plug with a fluted exterior surface. The crowns between flutes are closely fitted to the wall of the support member bore which receives the plug. After insertion of the plug into the bore the former is expanded to achieve a force fit. As the plug is expanded the flute area is reduced. Thus, it is seen that air flow is adjustable by controlling the amount of plug expansion.

The cylindrical wall of the plug near the exit end thereof is provided with an annular groove which serves to break up the high velocity flow of air coming down the flutes and thereby distribute flow evenly over the exit end lip of the plug at a lower velocity. This feature contributes to a reduction of turbine torques.

Accordingly, a primary object of the instant invention is to provide a novel construction for a metering plug which is economical to manufacture, assemble and adjust.

Another object is to provide a novel means for adjusting the flow of fluid through a fluid metering device.

Still another object is to provide a novel air bearing means metering plug which equally distributes air flow and thereby reduces turbine torques.

A further object is to provide a novel metering plug which is assembled and adjusted by expansion transverse to the direction of fluid flow through the plug.

These as well as further objects of this invention shall become readily apparent after reading the following description of the accompanying drawings in which:

FIGURE 1 is a cross section showing a plurality of plugs mounted to form a cylindrical air bearing means.

FIGURE 2 is a longitudinal cross section through a metering plug constructed in accordance with the teachings of the instant invention.

FIGURES 3 and 4 are end views of the plug of FIGURE 2 looking in the directions of arrows 3—3 and 4—4, respectively, of FIGURE 2.

Now referring to the figures. FIGURE 1 illustrates cylinder 11 equilibriumly mounted within ring portion 12 of manifold 13 by means of air under pressure supplied through conduit 14. Ring-like portion 12 forms the inner boundary of manifold 13 which is also provided with end walls 15, only one of which is shown in FIGURE 1, and an outer ring-like wall 16. The latter is formed of four over-lapping arcuate sections secured together by screws 17 which enter threaded bores in T-shaped standoffs 18. Spacing between rings 12 and 16 is established by the legs standoffs 18.

Fluid is directed from conduit 14 through hollow fitting 21 threadably mounted in outer ring bore 22 into the chamber of manifold 13. Inner ring 12 is provided with a plurality of circularly arranged radial bores 23 spaced equally from one another to produce a symmetrical array. An individual fluid metering plug 25 is disposed within each of the bores 23.

Fluid under pressure within the chamber of manifold 13 passes through the orifices provided by plugs 25 and upon exiting therefrom supports cylinder 11. As is well known to the art, should cylinder 11 move from its equilibrium position with respect to inner manifold ring 12, space 24 therebetween will become narrowed at one portion and widened at a diametrically opposed portion. In the narrow portion fluid pressure will increase while in the widened portion fluid pressure will decrease and as a result cylinder 11 will be returned to its equilibrium position.

As is also well known to the art, one or more additional circular arrays of metering plugs are provided along the axis of cylinder 11 for maintaining the equilibrium position of cylinder 11 along its entire length.

Metering plug 25 is formed with a cylindrical body 26 having four flutes 27 equally spaced in a circular array on the outer surface of cylinder 26. Each of the flutes 27 extends from the rear, or entrance, end 28, of plug 25 to an annular groove 29 in the exterior surface of cylinder 26. Grove 29 is separated from the front or exit 31 of plug 25 by narrow lip portion 32 of a diameter corresponding to the diameter of cylinder 26 at the deepest portions of flutes 27.

Body 26 is also provided with an axially extending tapered recess 33 which is open at entrance end 28. Tolerances between bore 23 and plug 25 are such that initial insertion is at a slightly loose to a light push fit. After initial insertion a support is placed against front plug surface 31 and a hard ball 34 is driven into tapered recess 33 by means of a force applied to tool 35. This expands cylinder 26 causing crown 27 which separate flutes 27 to grip the wall of bore 23, and expands the flutes 27 thereby constricting the flute area. Naturally, the greater the expansion of plug 25 the more constricted flutes 27 will become thereby decreasing the orifices to fluid flow from manifold 13.

In carrying out the foregoing mounting operation the fixture in engagement with the plug exit end 31 also positions end 31 with respect to the inner surface of support member 12. This fixture should also have means for supplying pressurized air and means for monitoring air flow through the plug 25. Initially flow of pressurized air must be greater than desired value. The assembler drives ball 34 into recess 33, while monitoring air flow, until the desired value of air flow is reached.

It has been found that the provision of annular groove 29 and/or reduced diameter smooth annular lip 32 at the exit of plug 25 results in diminishing the velocity of air flowing through flutes 27 and evenly distributing this air at a diminished flow rate at the exit of plug 25 thereby reducing turbine torques.

Plug 25 is preferably constructed of a fairly soft ductile material which can be cleanly etched. A suitable grade of ductile aluminum has been found to produce excellent results. Plug body 26 is about as long as support member 12 is thick and recess 33 is provided with an approximately four degree taper. Ball 34 should be of harder material than plug 25 and ball diameter should be about half of the plug diameter.

Flutes 27 are deep enough so that when plug 25 is initially inserted in bore 23 fluid flow is higher than desired with this flow being reduced as plug 25 is expanded. Plug expansion may also be brought about by utilizing a taper pin in place of the ball. For some situations this may be necessary since the expanding force is distributed over a larger area so that the gripping force in turn is distributed and stresses in support member 12 are reduced. Plug expansion may also be obtained by axially compressing cylinder 26.

For some applications plugs may be manufactured with undersized flutes. After mounting of this type plug to its support an etching solution is forced through the flutes to increase the size thereof. For this type of construction the expanding feature may not be needed should the support member bore and the plug be manufactured to tolerances which insure a tight fit.

Thus, this invention provides an economical and convenient method of assembling an air metering device with an air bearing part and also provides a means of adjusting air flow by equal amounts in all flutes of the plug. This produces symmetric air flow from plug to plug and is essential in order to produce air bearings having inherently low turbine torques. While there is no apparent upper size limit to the metering plugs of the instant invention, at present they appear to be most useful in the small size range i.e. about 1/16 of an inch with total orifice areas as low as .000001 of an inch square.

Although there has been described a preferred embodiment of this novel invention, many variations and modifications will not be apparent to those skilled in the art. Therefore, this invention is to be limited, not by the specific disclosure herein, but only by the appending claims.

The embodiments of the invention in which an exclusive privilege or property is claimed are defined as follows:

1. A fluid flow device comprising a mounting member with a recess having a cylindrical wall and a metering plug mounted within said recess; said plug including a cylindrical element having a plurality of flutes in its exterior surface; said flutes extending parallel to the cylindrical axis of said element and being separated from each other by radially projecting crowns extending parallel to said axis; said crowns having their tips in frictional engagement with said wall; said flutes providing metering orifices bounded by said wall; said element being provided with a tapered recess extending along the cylindrical axis.

2. A device as set forth in claim 1 in which the wide part of said tapered recess is open at one end of said element.

3. A fluid flow device comprising a mounting member with a recess having a cylindrical wall and a metering plug mounted within said recess, said plug including a cylindrical element having a plurality of flutes in its exterior surface; said flutes extending parallel to the cylindrical axis of said element and being separated from each other by radially projecting crowns extending parallel to said axis; said crowns having their tips in frictional engagement with said wall; said flutes providing metering orifices bounded by said wall; said cylindrical element being provided with an annular groove in its external surface, said groove being positioned near one end of said element and being generated about an axis parallel to the cylindrical axis; said flutes extending from said groove to the other end of said element.

4. A device as set forth in claim 3 in which the element is provided with a short cylindrical lip in the region between the groove and said one end.

5. A device as set forth in claim 4 in which the wide part of said tapered recess is provided with a tapered recess extending along the cylindrical axis.

6. A device as set forth in claim 5 in which the wide part of the tapered recess is open at the other end of the element.

7. A device as set forth in claim 6 in which the recess of the mounting member is open at a first end positioned in the region at the other end of the element.

8. A device as set forth in claim 7 in which the recess of the mounting member is also open at a second end positioned in the region at said one end of said element.

References Cited by the Examiner

UNITED STATES PATENTS

| 1,262,351 | 4/1918 | Jones et al. | 138—42 |
| 1,955,400 | 4/1934 | Zerk | 138—42 |
| 2,423,203 | 7/1947 | Oldham | 29—157 |
| 2,468,824 | 5/1949 | Hughey | 29—157 |
| 2,952,071 | 9/1960 | Burt | 29—157 |
| 3,109,459 | 11/1963 | Lee et al. | 138—40 |

LAVERNE D. GEIGER, *Primary Examiner.*

SAMUEL ROTHBERG, *Examiner.*

T. L. MOORHEAD, *Assistant Examiner.*